(No Model.)　　　　J. J. CALLENDER.　　2 Sheets—Sheet 2.
HARROW.
No. 537,272.　　　　　　　　Patented Apr. 9, 1895.
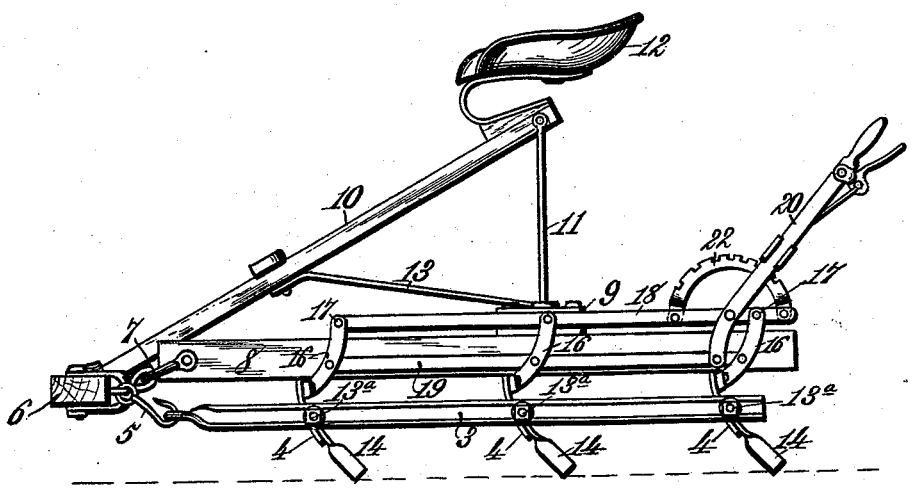
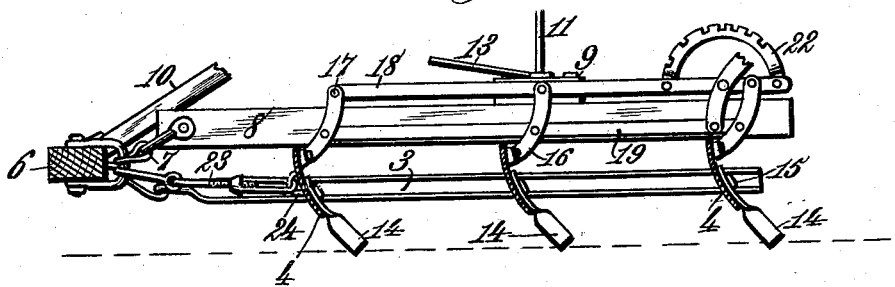
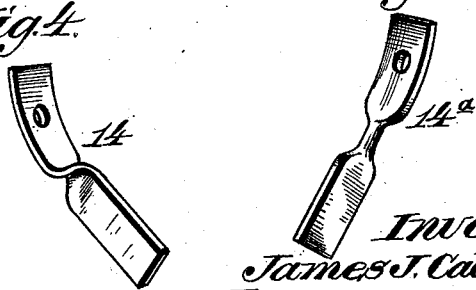
Witnesses.
Inventor:
James J. Callender.
By James L. Norris.
Atty.

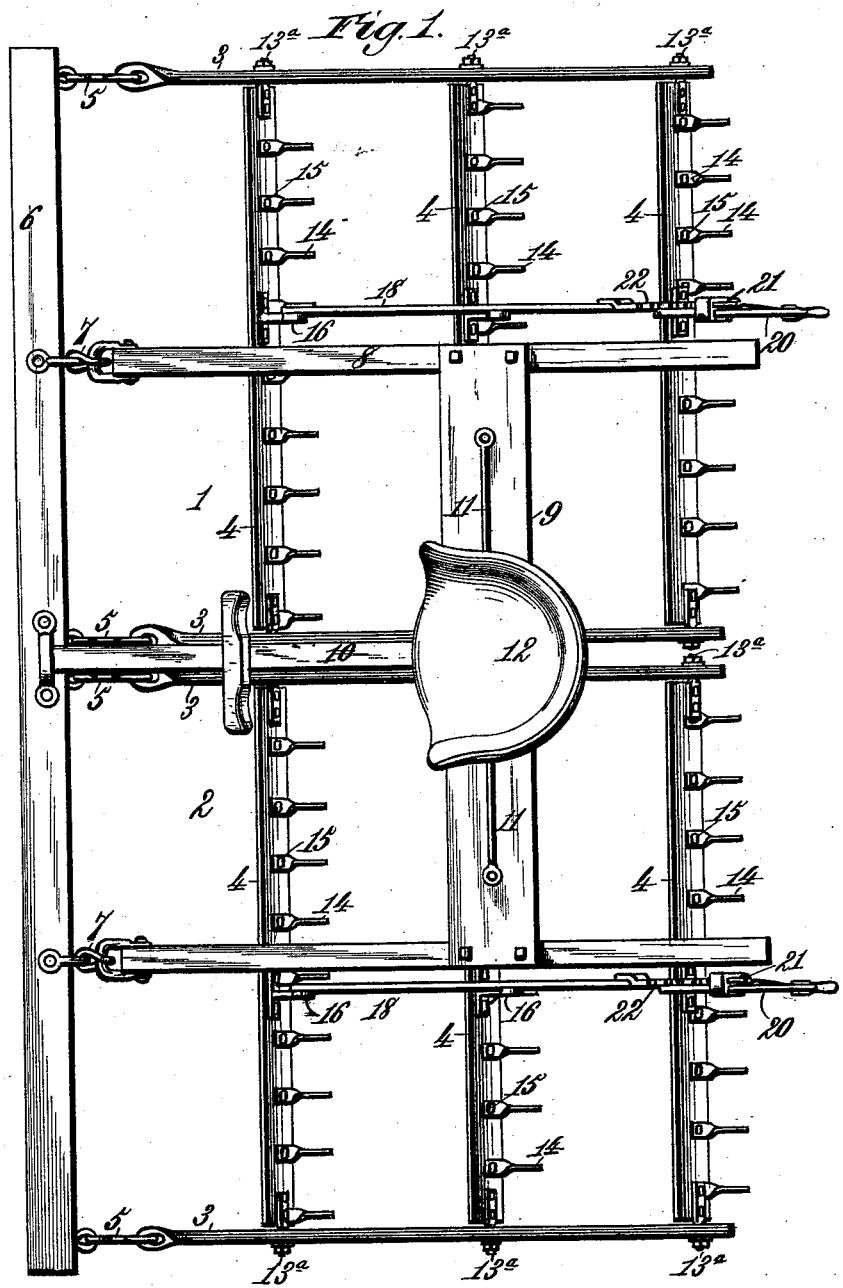

UNITED STATES PATENT OFFICE.

JAMES J. CALLENDER, OF GENESEO, ILLINOIS.

HARROW.

SPECIFICATION forming part of Letters Patent No. 537,272, dated April 9, 1895.

Application filed November 13, 1894. Serial No. 528,607. (No model.)

*To all whom it may concern:*

Be it known that I, JAMES J. CALLENDER, a citizen of the United States, residing at Geneseo, in the county of Henry and State of Illinois, have invented new and useful Improvements in Harrows, of which the following is a specification.

My invention relates to an improved harrow, and has for its object to provide improvements in the construction of the harrow teeth, and the toothed bars and the method of adjusting the same, whereby the inclination and depth of penetration of the teeth may be readily adjusted, or the teeth thrown out of action and the draft transferred to the tooth bars for moving the harrow from one field to another, or in crossing bridges, and for similar purposes, and to improve and simplify the construction of adjustable harrows generally.

To these ends my invention consists in the novel features and the combination and arrangement of parts hereinafter fully described and definitely pointed out in the claims following the description.

In order to enable others skilled in the art to which my invention pertains to make and use the same, I will now describe its several parts in detail, reference being had to the accompanying drawings, forming a part of this specification, wherein—

Figure 1 is a plan view of my improved harrow. Fig. 2 is a side elevation. Fig. 3 is a transverse section taken through one of the harrow sections; and Fig. 4 is a perspective view of one of the teeth. Fig. 5 is a similar view of a modified form of tooth.

Referring to the drawings, the reference numerals 1 and 2 indicate the two sections of my improved harrow, which are arranged side by side, as shown, and each composed of metallic side-bars 3, 3, forming draft-bars, in which are journaled the tooth-bars 4, the forward ends of the draft-bars being flexibly connected by links 5 to a draft-beam 6. To said draft-beam 6 are also flexibly connected by shackles 7 beams 8, one for each harrow section, said beams extending rearwardly over the longitudinal centers of the two sections and resting upon the upper edges of the tooth-bars 4. The beams 8 are connected together at their centers by a cross-beam 9, rigidly bolted thereto. To the draft-beam 6 is attached one end of a rearwardly inclined bar 10, which at its rear end is connected to the cross-beam 9 by metallic rods or braces 11, and has mounted thereon a spring-supported seat 12. The seat-supporting bar 10 is further braced to the cross-beam 9 by a brace-rod 13 fastened at its opposite ends to the bar 10 and beam 9 respectively.

In order to prevent sagging of the tooth-bars between their ends I provide adjustable links 23, one for each section, said links being hooked at one end to the shackles 7 on the draft-beam and at their other ends secured by eye-bolts 24 to the forward central portions of the front tooth-bars. By adjusting said links in the usual and well known manner any slack in the connection between the central portions of the tooth-bars and draft-beam may be taken up and all liability of the tooth-bars sagging is prevented.

The tooth-bars 4 are formed of slightly concavo-convex steel plates, provided at their opposite ends with journals 13$^a$ which project from the ends of the bars at points slightly below the longitudinal center of the latter, for the purpose hereinafter described, and said journals are pivotally seated in suitable perforations formed in the draft bars 3 at the required distances apart. The teeth each consist of a flat metallic bar 14, torsionally bent or twisted at its center or rounded and twisted at its center to cause its opposite extremities to lie in planes at a right angle to one another, said teeth being curved rearwardly upon the arc of the same circle upon which the tooth-bars are curved. The teeth are secured at suitable uniform distances apart to the rear sides of the tooth-bars 4, by bolts 15, a single bolt only being employed for fastening each tooth, the teeth being prevented from having any oscillating movement about the bolts owing to the curvature of the tooth-bars and the teeth. The lower curved portions of the teeth are bent at right angles to their upper portions, as described, so as to present sharp cutting edges, which operate to effectually cut and pulverize the earth.

The teeth of one tooth-bar may, if desired, be so arranged relatively to the teeth of an adjacent tooth-bar in the same section that the several series of teeth will be caused to traverse or furrow the earth in different parallel lines, thus acting upon every portion thereof.

The teeth are adjusted at different inclinations by mechanism constructed as follows: To each of the tooth-bars 4, near its longitudinal center, is rigidly bolted one end of an upwardly extending arm 16, the upper extremities of said arms being pivotally connected, as at 17, to a link-bar 18, a similar link-bar 19 being connected in like manner to the arms 16 intermediate the ends of the latter. To the link-bar 19, near its rear end, is pivotally secured the lower end of a hand-lever 20, said hand-lever being also pivotally connected to the link-bar 18. The lever 20 is provided with a spring-latch 21, of ordinary and well known construction, which is adapted to engage a toothed segment 22 secured to the link-bar 18, and by means of which the hand-lever is locked in its adjusted position. By throwing the hand-lever forward the link-arms 18 and 19 are actuated to swing forward the arms 16, thus rocking the tooth-bars 4 upon their journals $13^a$ so as to elevate the rear ends of the teeth and increase the angle of their inclination to the ground, and when the hand-levers are thrown forward to their limit of movement the teeth will be raised entirely from contact with the earth, the harrow then resting on the convex faces of the tooth-bars which act as runners to facilitate transporting the harrow from one place to another, or in crossing bridges, and the like. It will, of course, be understood that each section will be provided with a hand-lever and its connected mechanism for adjusting the teeth.

The operation of the harrow will be readily understood.

As the harrow is drawn over the ground to be operated upon, by power applied to the draft-beam 6, and the tooth-bars 4 and their teeth having been adjusted to the desired position, the teeth, aided by the weight of the driver, penetrate the soil and cut up and finely pulverize the same, while the lower curved edges of the tooth-bars rest upon the surface of the soil, operating to level the same and crush the clods. The depth to which the teeth penetrate the soil is regulated by varying their inclination in the manner before described, or the teeth thrown entirely out of contact with the earth to bring the weight of the harrow upon the curved faces of the tooth-bars. I have shown the tooth-bars provided with journals $13^a$ arranged slightly below the longitudinal center thereof, which arrangement operates to bring the draft nearer to the bottom of the tooth-bars. I have also shown the harrow made in two sections, but it will be manifest that the number of sections employed is unimportant and may be altered by merely shifting the position of the seat and its supports.

In Fig. 5 is illustrated a modified form of tooth, which, instead of being formed from a bar flattened throughout its length, is flattened at each end and at the center is rounded, as shown, the opposite flattened portions lying in planes at right angles to each other, as before described. A tooth thus constructed is less liable to collect débris than a tooth formed from a bar flattened throughout its length, and is therefore for some kinds of work preferable.

Having described my invention, what I claim is—

1. In a harrow, the combination with draft-bars attached to a draft beam, of rearwardly curved tooth-bars segment shaped in cross-section and having their convex sides disposed toward the front of the harrow, the opposite ends of said tooth-bars being journaled in said draft bars; downwardly and rearwardly projecting segment-shaped teeth corresponding in curvature to the tooth-bars and secured to the concave side thereof, and means for adjusting the inclination of said tooth bars and teeth, substantially as described.

2. In a harrow, the combination with draft-bars attached to a draft-beam, of curved tooth-bars segment-shaped in cross-section and having their convex sides disposed toward the front of the harrow, the opposite ends of said tooth-bars being journaled in said draft-bars, downwardly and rearwardly projecting segment-shaped teeth corresponding in curvature to the tooth-bars and secured to the concave side thereof, and means for simultaneously throwing the teeth out of engagement with the earth and throwing the convex sides of the tooth-bars in contact therewith, substantially as and for the purpose specified.

In testimony whereof I have hereunto set my hand and affixed my seal in presence of two subscribing witnesses.

JAMES J. CALLENDER. [L. S.]

Witnesses:
S. E. ROBINSON,
FRANK MCARTHUR.